May 29, 1923.

Re. 15,615

E. G. CARR

SUBGRADE SCRAPER

Original Filed March 7, 1917 2 Sheets-Sheet 1

Inventor
Edward G. Carr
By Bottum, Bottum, Hudnall & Fischer
Attorneys.

May 29, 1923.

Re. 15,615

E. G. CARR

SUBGRADE SCRAPER

Original Filed March 7, 1917 2 Sheets-Sheet 2

Inventor
Edward G. Carr
By Bottum, Bottum, Hudnall & Pelcher
Attorneys.

Re. 15,615

Reissued May 29, 1923.

UNITED STATES PATENT OFFICE.

EDWARD G. CARR, OF MILWAUKEE, WISCONSIN.

SUBGRADE SCRAPER.

Original No. 1,268,925, dated June 11, 1918, Serial No. 153,144, filed March 7, 1917. Renewed November 15, 1917, Serial No. 202,257. Application for reissue filed May 8, 1919. Serial No. 295,791.

*To all whom it may concern:*

Be it known that I, EDWARD G. CARR, a citizen of the United States, and a resident of Milwaukee, in the county of Milwaukee and State of Wisconsin, and formerly a resident of Oakland, in the county of Alameda and State of California, have invented certain new and useful Improvements in Subgrade Scrapers, of which the following is a specification.

My invention is an improvement in subgrade-scrapers, and has for its object to provide mechanism of the character specified adapted to run upon the header boards or forms and to cut away the surface of the grade, and wherein the cutting blades may be adjusted to any desired depth, and wherein means is provided for permitting the scraper to be turned without the necessity of removing it from the roadway.

Figure 1:
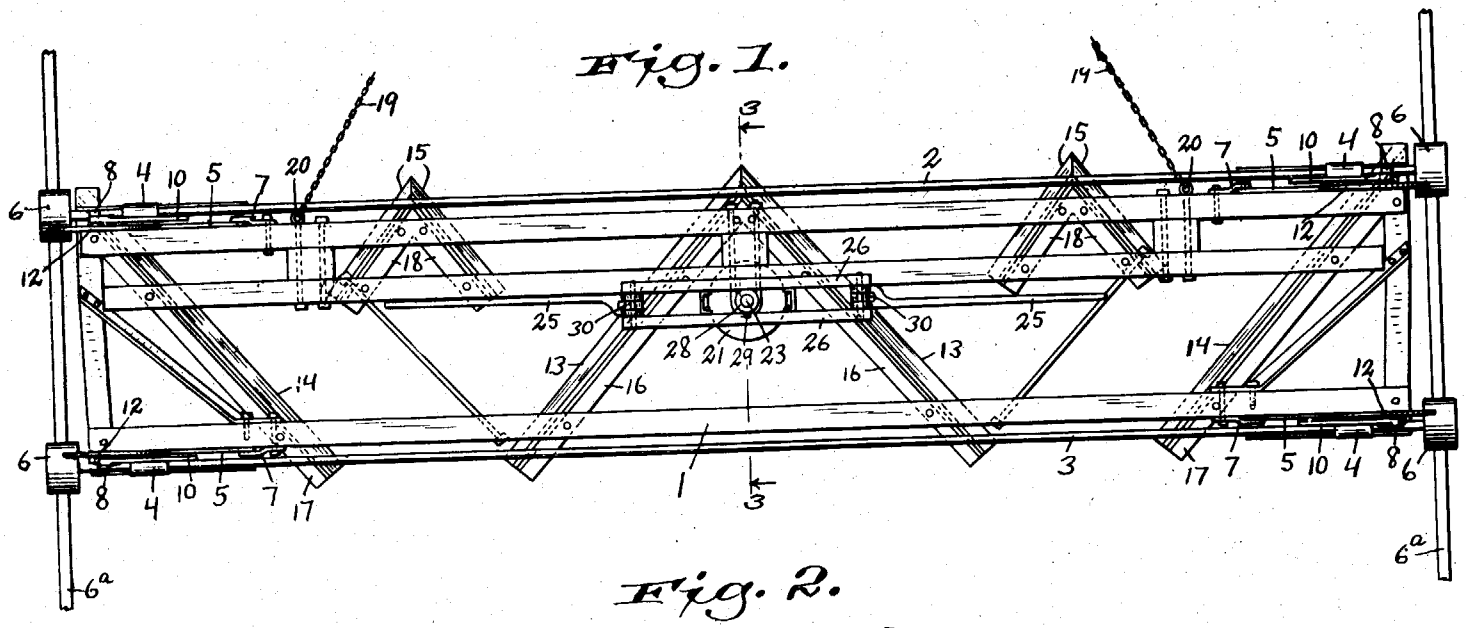
Figure 1 is a top plan view of the improved scraper.

In the embodiment of the invention shown in Figs. 1 to 5, the scraper comprises a suitable frame 1 of substantially rectangular outline, and shafts 2 and 3 are journaled longitudinally of the frame at the opposite sides thereof, and outside of the frame. These shafts are journaled in bearings 4 on adjusting plates 5, which are supported by the frame, when the frame is lifted to be turned, but, under other conditions, support the frame upon the shafts, and wheels 6 are journaled on the ends of the shafts. These wheels are adapted to run upon the header boards or forms $6^a$ for the roadway, and the adjusting plates 5 permit the frame 1 to be raised or lowered, that is, to be adjusted vertically with respect to the header boards or forms $6^a$.

These adjusting plates 5 are connected with the frame 1 at their inner ends by links 7, each link being pivoted at one end to the frame and at its other end to an adjusting plate, and the said plates are of angle material, as shown. The outer end of each plate is connected by a link 8 with an angular lug 9 on a lever 10, pivoted on the frame, and having a transverse pin 11 which is adapted to engage with one of a series of openings in a quadrant 12 secured to the frame for holding the lever in adjusted position. It will be evident that by means of the levers 10 the frame 1 may be adjusted vertically with respect to the wheels 6 and their supports, viz.—the header boards or forms $6^a$. Scraper blades 13, 14 and 15 are supported from the frame depending below the same in inclined or undercutting position, the blades 13 and 15 being arranged in pairs.

As shown in Fig. 1, the blades 13 are at the center of the frame, being arranged in inverted V-shape. The blades 14 are inclined inwardly from front to rear, and the rear end of each blade 14 is spaced apart from the rear end of the adjacent blade 13 to allow the scraper to pass material which has been displaced by the blades without and to prevent the displaced material from materially impeding the progress of the scraper. Each pair of blades 15 is arranged in inverted V-shape in front of the space between the adjacent pair of blades 13 and 14. The blades 13 are connected with a suitable supporting frame 16 of angle material, and each blade 14 is connected to a similar supporting frame 17, the frames 16 and 17 being connected with the main frame 1. Each pair of blades 15 is connected with a supporting frame 18, the said frames 16, 17 and 18 being of angle material, as shown more particularly in Fig. 2, each frame having a portion secured to the main frame and the other portion depending therefrom for the attachment of the blades.

Figure 2:
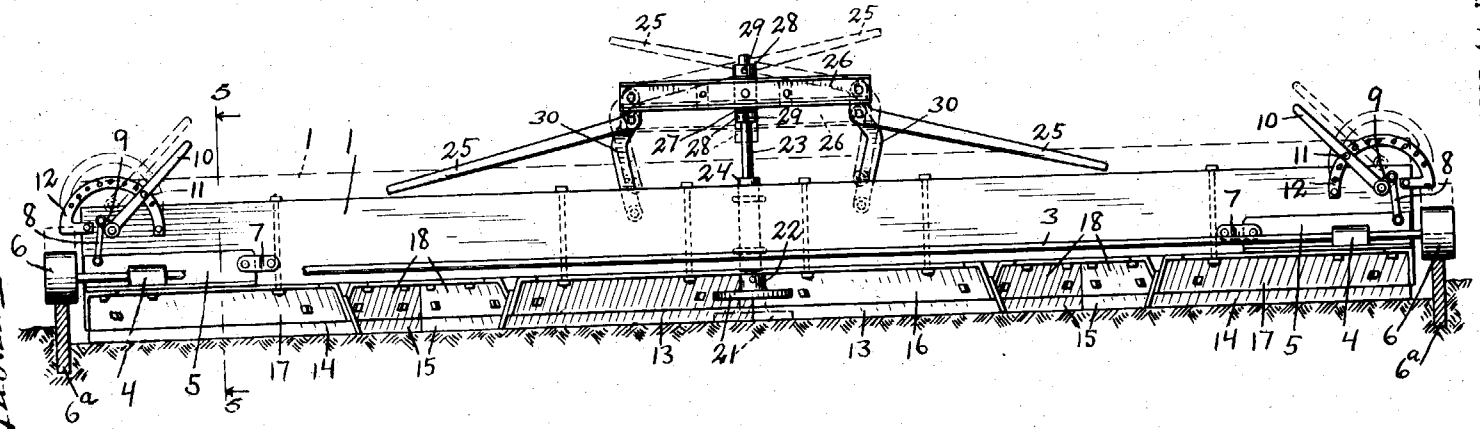
Fig. 2 is a rear view.
Figure 4:
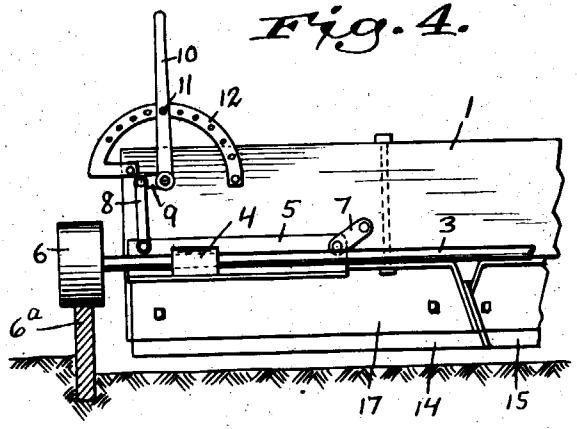
Fig. 4 is a partial rear view showing the method of adjusting the frame.
Figure 3:
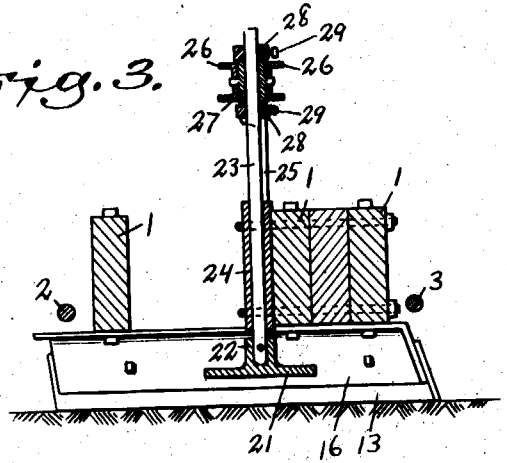
Fig. 3 is a section on the line 3—3 of Fig. 1, looking in the direction of the arrows adjacent to the line.
Figure 5:
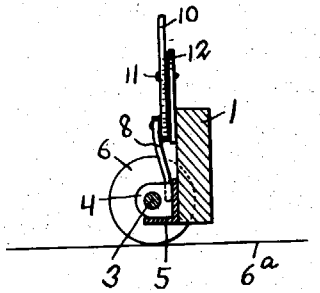
Fig. 5 is a section on the line 5—5 of Fig. 2, looking in the direction of the arrows adjacent to the line.

Suitable draft apparatus, indicated at 19, is connected with the front of the frame by means of eyebolts 20, the said draft apparatus being chains, in the present instance, which may be attached to a suitable motor. A shoe 21 is arranged at the center of the frame 1, the said shoe having a hub 22, into which engages the lower end of a shaft 23, the shoe being connected with the shaft 23 by a pin, as shown by Figs. 2 and 3 of the drawings. This shaft 23 passes through a sleeve 24 secured to the main frame and relative movements between the shaft 23 and the main frame 1 can be effected by means of elbow levers 25. Each of these levers 25 consists of a long arm and a short arm, the end of a short arm being pivoted between the adjacent ends of a pair of channel bars 26. The channel bars 26 are arranged with their channels outward and in spaced relation, and a bushing 27 is arranged on the shaft 23 between the channel bars, the said bushing being secured to the channel bars as shown in Figs. 2 and 3.

Stop collars 28 are held on the shaft 23 above and below the bushing by means of set screws 29, and bent links 30 are pivotally connected with the frame 1 at their lower ends and are pivotally connected at their upper ends to the levers 25 at the junctions of the angular portions of said levers. It is evident, from an inspection of Fig. 2 of the drawings, that, when the levers 25 occupy the positions shown by full lines, the shoe 21, the shaft 23 and the channel bars 26 will be supported upon the frame 1 by the links 30 and the shoe 21 will be raised above the ground. When the levers 25 are swung into the positions shown by dotted lines, it is also evident that the first effect is to swing the upper ends of the links 30 outwardly and to lower the channel bars 26 into the position shown by dotted lines in Fig. 2 with the shoe 21 resting on the ground, and that the second effect is to lift the links 30, the frame 1 and parts connected with the frame to the positions shown by dotted lines. The pivots connecting the links 30 with the levers 25 are directly below or above the pivots connecting the levers 25 with the channel bars 26, when the levers 25 are in their extreme positions of movement, as shown by Fig. 2 of the drawings, so no special means are required to hold the levers 25 in their positions. When the scraper is lifted and resting upon the shoe 21, the scraper can be turned around end for end to reverse its direction of operation, for another cut over the same area, or it may be only partly turned to permit traffic on the road.

It will be evident that when the scraper is in operation with the wheels 6 running on the header boards or forms $6^a$, the blades will remove all material projecting above a line established by the lower edges of the scraper blades, and that, by adjusting the scraper blades, one or more cuts, either heavy or light, may be made to quickly, cheaply and accurately establish and finish a definite grade with respect to the header boards or forms $6^a$. The header boards or forms $6^a$ provide a base track with reference to which a definite grade may be made.

Figure 6:
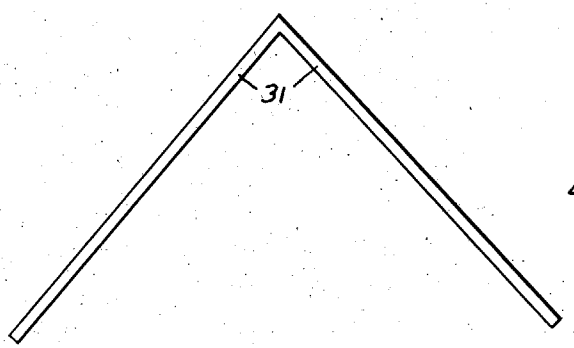
Fig. 6 is a diagrammatic view showing a modified arrangement of the blades.

Instead of arranging the blades in the manner shown in Fig. 1, they may be arranged in other ways, for example, as diagrammatically shown in Fig. 6, wherein a central pair of blades 31 is provided arranged in inverted V-shape and lateral blades 32, the blades 31 and 32 being so arranged that their rear ends will lap to completely loosen the top layer of soil.

It will be noticed that the bushing 27 has pintles which extend in opposite directions, and in the same straight line, through the channel bars 26 so that the said channel bars are journaled on the pintles. This construction hinges the frame composed of the channel bars 26 with respect to the shaft 23 so that the ends of the channel bars may be tilted up or down and the positions of the levers 25 may be changed by moving one lever at a time, whereby only one man is required to operate the scraper when it is desired to turn it or completely reverse it.

I claim:

1. A scraper of the character specified comprising a frame, scrapers carried by the frame, wheels for supporting the frame and means at the center of the frame for raising the frame, the frame being rotatable on the said means, and the said means comprising a shoe adapted to engage the ground, a shaft journaled on the frame to which the lower end of the shoe is connected, a bearing frame through which the shaft extends, said shaft having fixed collars above and below the frame, elbow levers pivoted to the ends of the frame, and links connecting the said levers with the main frame.

2. A scraper of the character specified comprising a frame, scrapers carried by the frame, shafts extending longitudinally of the frame at opposite sides thereof and at the outer sides of the frame, wheels on the ends of the shafts, a connection between each shaft and the frame for permitting the frame to be raised or lowered with respect to the shaft and to be held in adjusted position, and means at the center of the frame for raising the frame, the frame being rotatable on the said means.

3. In a subgrade-scraper, the combination with a frame adapted to be moved upon a base track, of a plurality of undercutting scraper blades or cutters adjustably supported so that material may be removed to a definite, predetermined required depth by one or more definite cutting movements of the subgrade-scraper over the same area, the scraper blades or cutters being so arranged as to allow material displaced thereby to be passed by the subgrade-scraper as it is moved forward.

4. In a subgrade-scraper, the combination with a frame adapted to be moved upon a base track, of a plurality of scraper blades or cutters adjustably supported so that material may be removed to the required depth by one or more movements of the subgrade-scraper over the same area, the scraper blades or cutters being so arranged as to allow material displaced thereby to be passed by the subgrade-scraper as it is moved forward, and means for elevating the subgrade-scraper to rotatably support it.

5. The combination with a base track with reference to which a grade is to be established, of a vertically adjustable undercutting and non-impeding-progress scraper or cutter blade mechanism supported thereby.

6. The combination with a scraper or cutter blade mechanism, of a shoe, a bearing frame journaled with respect to the shoe, and independently operable means to cause relative movements between the shoe and the scraper or cutter blade mechanism.

7. The combination with a scraper or cutter blade mechanism, of a shoe, a frame pivoted with respect to the shoe, and independently operable means connected with said frame to lift the scraper or cutter blade mechanism to rotatably support it upon said shoe.

8. Means for preparing a mold for a concrete slab for roads, or similar purposes, consisting of forms set so that their tops occupy predetermined positions vertically with respect to a subgrade to be prepared, and a frame adapted to be moved upon said forms and provided with undercutting cutters whereby the frame will be held in contact with the forms, and the cutters being adjustably supported so that they can be depressed below the tops of the forms far enough to make the mold of sufficient depth for the concrete slab.

In witness whereof I hereto affix my signature.

EDWARD G. CARR.